United States Patent
Watanabe et al.

(10) Patent No.: US 10,930,070 B2
(45) Date of Patent: Feb. 23, 2021

(54) PERIPHERY MONITORING DEVICE

(71) Applicant: AISIN SEIKI KABUSHIKI KAISHA, Kariya (JP)

(72) Inventors: Kazuya Watanabe, Kariya (JP); Tetsuya Maruoka, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 0 days.

(21) Appl. No.: 16/691,981

(22) Filed: Nov. 22, 2019

(65) Prior Publication Data

US 2020/0167996 A1 May 28, 2020

(30) Foreign Application Priority Data

Nov. 28, 2018 (JP) .............................. JP2018-222803

(51) Int. Cl.
*G06T 17/20* (2006.01)
*G06T 15/60* (2006.01)
*B60R 1/00* (2006.01)

(52) U.S. Cl.
CPC .............. *G06T 17/20* (2013.01); *B60R 1/002* (2013.01); *G06T 15/60* (2013.01); *B60R 2300/105* (2013.01); *B60R 2300/302* (2013.01); *B60R 2300/303* (2013.01); *B60R 2300/304* (2013.01)

(58) Field of Classification Search
CPC ...................................................... G06T 17/20
See application file for complete search history.

(56) References Cited

U.S. PATENT DOCUMENTS

| | | | | |
|---|---|---|---|---|
| 6,417,854 | B1* | 7/2002 | Isowaki | A63F 13/10 345/473 |
| 7,161,616 | B1 | 1/2007 | Okamoto et al. | |
| 9,077,861 | B2 | 7/2015 | Ohno et al. | |
| 9,479,740 | B2 | 10/2016 | Moriyama et al. | |
| 10,339,811 | B2 | 7/2019 | Ohno et al. | |
| 10,347,150 | B1* | 7/2019 | Tamir | G09B 9/042 |
| 2010/0245573 | A1* | 9/2010 | Gomi | H04N 7/181 348/148 |
| 2015/0210213 | A1* | 7/2015 | Mitsuta | B60Q 5/001 340/435 |

(Continued)

FOREIGN PATENT DOCUMENTS

JP 3300334 B2 7/2002
JP 2014-068308 A 4/2014

(Continued)

*Primary Examiner* — Jitesh Patel
(74) *Attorney, Agent, or Firm* — Sughrue Mion, PLLC

(57) ABSTRACT

A periphery monitoring device includes: an acquisition unit configured to acquire a captured image from an imaging unit that captures an image of a periphery of a vehicle; a generation unit configured to generate a vehicle surrounding image indicating a situation around the vehicle in a virtual space based on the captured image; and a processing unit configured to display, on a display device, an image in which an own vehicle image is overlapped on the vehicle surrounding image, the own vehicle image indicating the vehicle in which a transmissive state of a constituent plane representing a plane constituting the vehicle is determined according to a direction of the constituent plane, and the vehicle surrounding image being represented based on a virtual viewpoint facing the vehicle in the virtual space.

6 Claims, 11 Drawing Sheets

(56) References Cited

U.S. PATENT DOCUMENTS

2016/0288717 A1* 10/2016 Kameshima ............. B60R 1/04
2018/0191960 A1    7/2018 Hatakeyama et al.

FOREIGN PATENT DOCUMENTS

| JP | 2014-197817 A | 10/2014 |
| JP | 5627253 B2 | 11/2014 |
| JP | 2018-110328 A | 7/2018 |

* cited by examiner

PERIPHERY MONITORING DEVICE

CROSS REFERENCE TO RELATED APPLICATIONS

This application is based on and claims priority under 35 U.S.C. § 119 to Japanese Patent Application 2018-222803, filed on Nov. 28, 2018, the entire contents of which are incorporated herein by reference.

TECHNICAL FIELD

Embodiments of this disclosure relate to a periphery monitoring device.

BACKGROUND DISCUSSION

In the related art, there has been known a technology of capturing images of the situation around a vehicle by multiple imaging units (cameras) provided in the vehicle respectively in different directions, performing an image processing on the captured multiple images, and connecting the respective images to generate, for example, a bird's-eye view image. A periphery monitoring device has been proposed, which displays an own vehicle image (own vehicle icon) for indicating the position of an own vehicle so as to be overlapped on such a bird's-eye view image, thereby making it easy for a user to grasp the position of the own vehicle with respect to the surrounding situation (e.g., an obstacle and the like). By the way, when the own vehicle image is displayed together with the bird's-eye view image, a portion of the bird's-eye view image is hidden by the own vehicle image, so that a blocked area (blind spot) is generated. In other words, the situation around the own vehicle may not be sufficiently provided to the user. Therefore, there is a proposal of a technology of displaying the blocked area as if it is a visible area by increasing the transmittance of the entire own vehicle image or by representing the own vehicle image with a wire frame model. Further, there is a proposal of a technology of realizing display to make a comprehensive determination of the situation around the own vehicle by changing the position of a virtual viewpoint to move the blocked area. See, e.g., JP 3300334B (Reference 1), JP 5627253B (Reference 2), JP 2014-197817A (Reference 3), JP 2014-068308A (Reference 4), and JP 2018-110328A (Reference 5).

By increasing the transmittance of the entire own vehicle image, it makes it easy for the user to recognize content reflected in the blocked area hidden by the own vehicle image. However, on the other hand, since the visibility of the own vehicle image may be reduced, it may be difficult to grasp a relationship between the own vehicle and the surroundings, for example, a positional relationship between the own vehicle and an obstacle when there exists the obstacle. Further, when using the wire frame model, the content reflected in the blocked area may be viewed, but image content may be complicated because wires overlap each other, which may also make it difficult to grasp a relationship between the own vehicle image and the surroundings (e.g., a relationship between the own vehicle and the obstacle). Further, when moving a virtual viewpoint to allow the user to make a comprehensive determination, it may take time to grasp the surrounding situation and the user may have difficulty in making an intuitive determination.

Thus, a need exists for a periphery monitoring device which is not susceptible to the drawback mentioned above.

SUMMARY

A periphery monitoring device according to an aspect of this disclosure includes, for example, an acquisition unit configured to acquire a captured image from an imaging unit that captures an image of a periphery of a vehicle, a generation unit configured to generate a vehicle surrounding image indicating a situation around the vehicle in a virtual space based on the captured image, and a processing unit configured to display, on a display device, an image in which an own vehicle image is overlapped on the vehicle surrounding image, the own vehicle image indicating the vehicle in which a transmissive state of a constituent plane representing a plane constituting the vehicle is determined according to a direction of the constituent plane, and the vehicle surrounding image being represented based on a virtual viewpoint facing the vehicle in the virtual space.

BRIEF DESCRIPTION OF THE DRAWINGS

The foregoing and additional features and characteristics of this disclosure will become more apparent from the following detailed description considered with the reference to the accompanying drawings, wherein:

FIG. 1 is an exemplary and schematic perspective view illustrating a state where a part of a vehicle cabin of a vehicle capable of being mounted with a periphery monitoring device according to an embodiment is seen through;

DETAILED DESCRIPTION

Hereinafter, an exemplary embodiment disclosed here will be described. A configuration of the embodiment described later and actions, results, and effects provided by the configuration are given by way of example. This disclosure may be realized by a configuration other than the configuration disclosed in the following embodiment and may obtain at least one of various effects based on a basic configuration and derivative effects.

Figure 1:
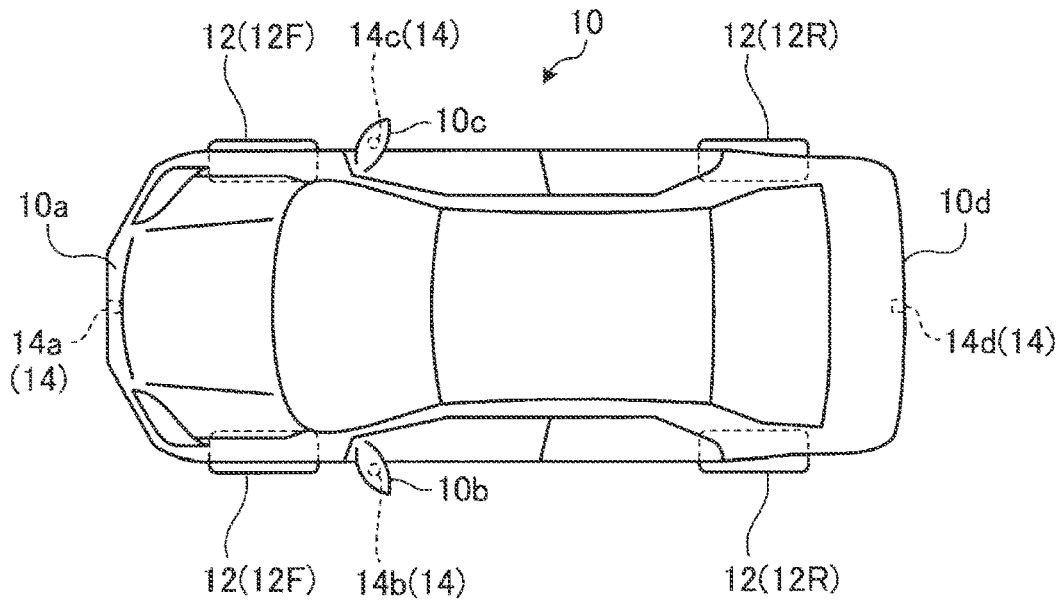

FIG. 1 is a schematic plan view of a vehicle 10 in which a periphery monitoring device according to the present embodiment is mounted. The vehicle 10 may be, for example, an automobile (internal combustion engine automobile) having an internal combustion engine (engine, not illustrated) as a drive source, an automobile (electric automobile, fuel cell automobile, or the like) having an electric motor (motor, not illustrated) as a drive source, or an automobile (hybrid automobile) having both the internal combustion engine and the electric motor as a drive source. Further, the vehicle 10 may be equipped with any of various transmissions, and may be equipped with various devices (systems, parts, or the like) required to drive the internal combustion engine or the electric motor. Further, the types, the number, and the layout of devices related to driving of wheels 12 (front wheels 12F and rear wheels 12R) in the vehicle 10 may be set in various ways.

As illustrated in FIG. 1, the vehicle 10 is provided with multiple imaging units 14, for example, four imaging units 14a to 14d. Each imaging unit 14 is, for example, a digital camera that incorporates an imaging element such as a charge coupled device (CCD) or a CMOS image sensor (CIS). The imaging units 14 may output video image data (captured image data, image information) at a predetermined frame rate. The imaging units 14 respectively include a wide-angle lens or a fish-eye lens and are capable of capturing an image of, for example, a range (imaging target area) from 140° to 220° in the horizontal direction. Further, the optical axes of the imaging units 14 may be set obliquely downward. Thus, the imaging units 14 sequentially capture images of the surrounding situation outside the vehicle 10 including the road surface on which the vehicle 10 is movable, marks (including arrows, lanes, lines indicating parking spaces, lane dividing lines, and the like) drawn on the road surface, or objects (e.g., obstacles such as pedestrians and vehicles) to output the images as captured image data.

The imaging units 14 are provided on an outer circumferential portion of the vehicle 10. For example, the imaging unit 14a is provided on a substantially central end in the vehicle width direction at the front side of the vehicle 10, i.e., at the front side in the vehicle longitudinal direction, for example, on a front bumper 10a or a front grill, and is capable of imaging a front area (front imaging target area) including a front end of the vehicle 10 (e.g., the front bumper 10a). Further, for example, the imaging unit 14b is provided on a left end of the vehicle 10, for example, on a left door mirror 10b, and is capable of imaging a left area (left imaging target area) including an area centered on the left side of the vehicle 10 (e.g., an area from the left front side to the left rear side). Further, for example, the imaging unit 14c is provided on a right end of the vehicle 10, for example, on a right door mirror 10c, and is capable of imaging a right area (right imaging target area) including an area centered on the right side of the vehicle 10 (e.g., an area from the right front side to the right rear side). Further, the imaging unit 14d is provided on a substantially central end in the vehicle width direction at the rear side of the vehicle 10, i.e., at the rear side in the vehicle longitudinal direction, for example, on a position above a rear bumper 10d, and is capable of imaging a rear area (rear imaging target area) including a rear end of the vehicle 10 (e.g., the rear bumper 10d).

The periphery monitoring device of the present embodiment may generate an image with a wider viewing angle or may generate a virtual image (a bird's-eye view image (planar image), a side view image, a front view image, or the like) of the vehicle 10 viewed from the upper side, the front side, the lateral side, or the like by executing an arithmetic processing or an image processing based on the captured image data (captured images) obtained by the multiple imaging units 14.

Figure 2:
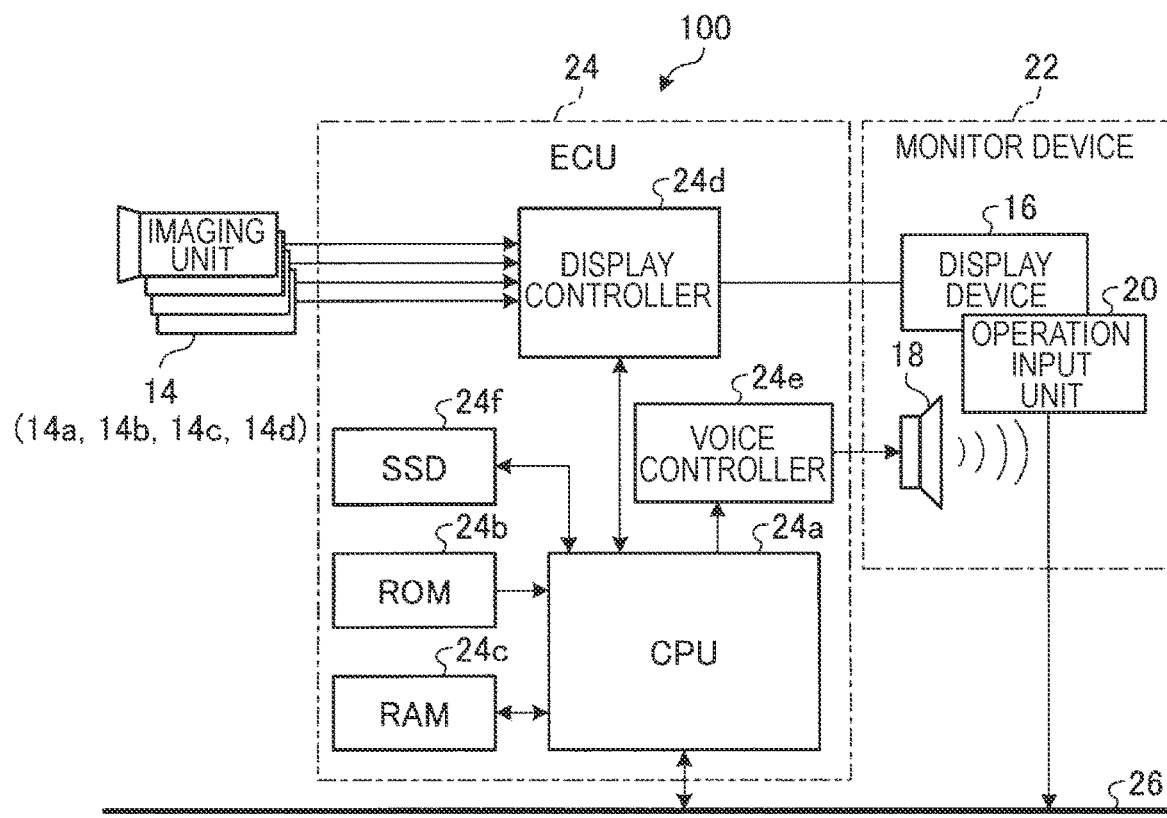
FIG. 2 is an exemplary and schematic block diagram illustrating a display functional configuration of the vehicle including the periphery monitoring device according to the embodiment.

FIG. 2 is an exemplary block diagram of a configuration of a periphery monitoring system 100 including the periphery monitoring device mounted in the vehicle 10. A display device 16 or a voice output device 18 is provided in a vehicle cabin of the vehicle 10. The display device 16 is, for example, a liquid crystal display (LCD) or an organic electroluminescent display (OELD). The voice output device 18 is, for example, a speaker. Further, for example, the display device 16 is covered with a transparent operation input unit 20 such as a touch panel. A user (e.g., a driver) may view an image displayed on a display screen of the display device 16 through the operation input unit 20. Further, the user may execute operation input by operating the operation input unit 20 via touching, pushing, or moving with a finger or the like at a position corresponding to the image displayed on the display screen of the display device 16. The display device 16, the voice output device 18, or the operation input unit 20 is provided, for example, in a monitor device 22 positioned on a central portion in the vehicle width direction, i.e., in the transverse direction of a dashboard of the vehicle 10. The monitor device 22 may include an operation input unit (not illustrated) such as a switch, a dial, a joystick, or a push button. For example, the monitor device 22 may also be used as a navigation system or an audio system.

Further, as illustrated in FIG. 2, the periphery monitoring system 100 (periphery monitoring device) includes an electronic control unit (ECU) 24 in addition to the imaging units 14 (14a to 14d) or the monitor device 22. In the periphery monitoring system 100, the ECU 24 and the monitor device 22 are electrically connected to each other via an in-vehicle network 26 as an electric communication line. The in-vehicle network 26 is configured as, for example, a controller area network (CAN). The ECU 24 may execute control of various systems by sending a control signal via the in-vehicle network 26. Further, the ECU 24 may receive, for example, operation signals of the operation input unit 20 or various switches or detection signals of various sensors (not illustrated) via the in-vehicle network 46.

The ECU 24 transmits a vehicle surrounding image generated based on the captured image data obtained by the imaging units 14 or voice related data to the monitor device 22. The ECU 24 includes, for example, a central processing unit (CPU) 24a, a read only memory (ROM) 24b, a random access memory (RAM) 24c, a display controller 24d, a voice controller 24e, a solid state drive (SSD) (flash memory) 24f, and the like.

The CPU 24a reads a program stored (installed) in a nonvolatile storage device such as the ROM 24b, and executes an arithmetic processing according to the program. The ROM 24b stores each program and parameters and the like required to execute the program. For example, the CPU 24a realizes various modules illustrated in FIG. 3 by executing the program stored in the ROM 24b, and executes a processing related to the image displayed on the display device 16. For example, the CPU 24a executes, as an example of a processing, a correction processing, an arithmetic processing, or an image processing on the captured image data imaged by the imaging units 14 to generate a vehicle surrounding image (e.g., a bird's-eye view image) obtained by connecting multiple images. Details of the CPU 24a will be described later.

The RAM 24c temporarily stores various data used in the arithmetic processing of the CPU 24a. Further, the display controller 24d mainly executes, for example, data conversion of display images to be displayed on the display device 16 in the arithmetic processing of the ECU 24. Further, the voice controller 24e mainly executes a processing of voice data output from the voice output device 18 in the arithmetic processing of the ECU 24. The SSD 24f may be a rewritable non-volatile storage unit and may store data even when the ECU 24 is powered off. Further, the CPU 24a, the ROM 24b, the RAM 24c, and the like may be integrated in the same package. Further, the ECU 24 may be configured to use another logical arithmetic processor such as a digital signal processor (DSP), a logic circuit or the like instead of the CPU 24a. Further, a hard disk drive (HDD) may be provided instead of the SSD 24f, and the SSD 24f or the HDD may be provided separately from the ECU 24.

In the present embodiment, the ECU 24 is in charge of an image generation processing of the image displayed on the display device 16 by cooperation of hardware and software (control program). The ECU 24 overlaps an own vehicle image indicating the position of the vehicle 10 and the direction or posture of the vehicle 10 when the vehicle 10 is viewed from a virtual viewpoint on a vehicle surrounding image generated by performing an image processing, for example, a viewpoint conversion processing on the captured image data (captured images) imaged by the imaging units 14 to display the images on the display device 16. In that case, the transmissive state of a constituent plane constituting the own vehicle image is determined according to the position of the virtual viewpoint and the direction of the constituent plane such that content reflected in the area (blocked area or blind spot) of the vehicle surrounding image that is hidden by the own vehicle image may be displayed. That is, the transmittance of a portion of the own vehicle image corresponding to the blocked area is increased such that the area hidden by the own vehicle image may be viewed. However, the transmittance is not increased in all portions of the own vehicle image. For example, the transmittance is increased as the constituent plane of the own vehicle image is closer to being parallel to the horizontal plane in the vehicle surrounding image. Conversely, the transmittance is reduced as the own vehicle image is closer to being perpendicular to the horizontal plane. In this case, for example, the transmittance of a ceiling portion of the own vehicle image corresponding to the ceiling of the vehicle 10 is increased. As a result, for example, when the virtual viewpoint is on the right side of the own vehicle image, the blocked area of the vehicle surrounding image hidden by the own vehicle image is displayed through the left side of the own vehicle image.

Figure 3:
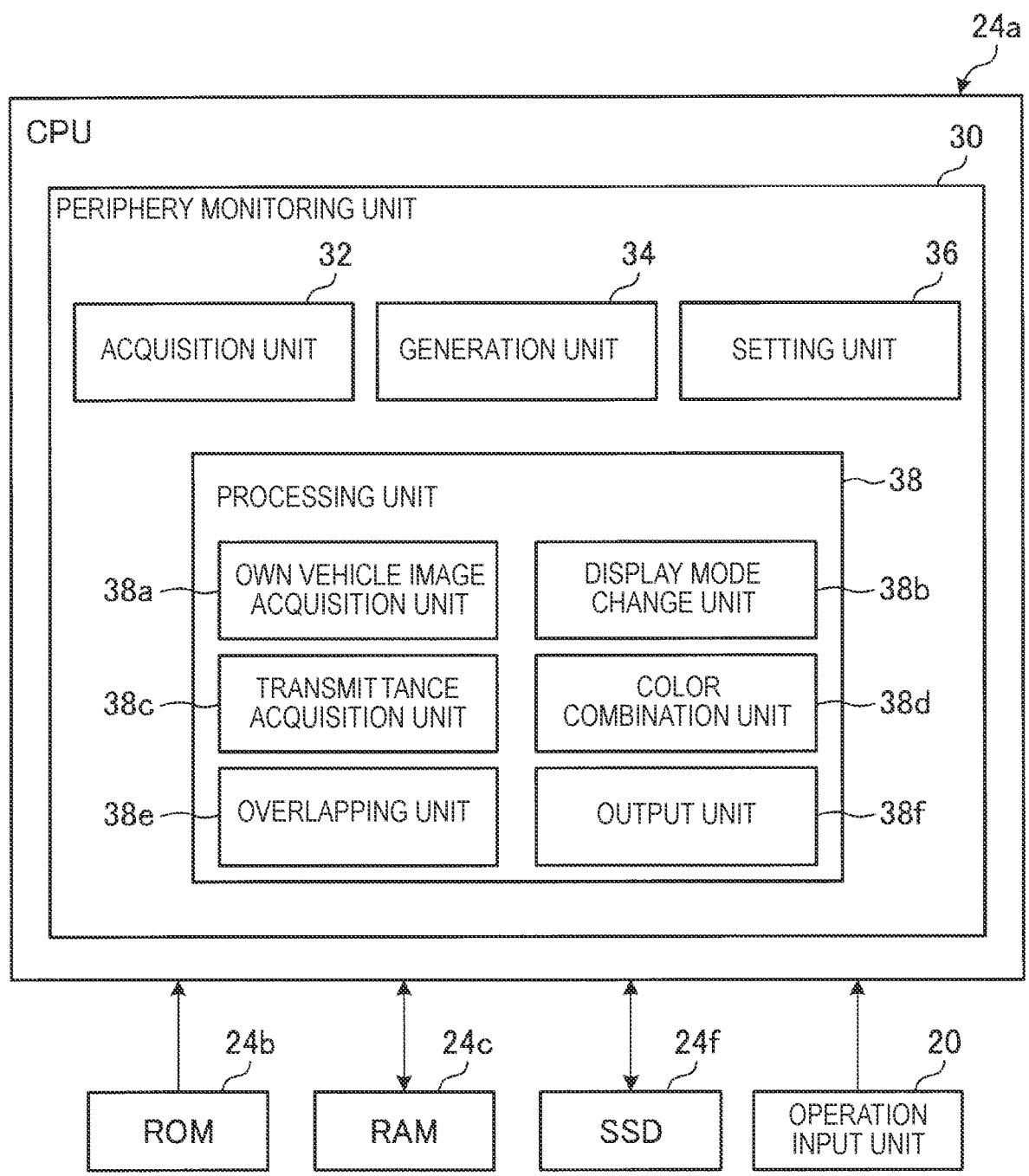
FIG. 3 is an exemplary and schematic block diagram illustrating a configuration in a case where the periphery monitoring device according to the embodiment is realized by a CPU.

FIG. 3 is an exemplary and schematic block diagram illustrating a configuration in a case where the periphery monitoring device is realized by the CPU 24a. The CPU 24a realizes a periphery monitoring unit 30 by executing a periphery monitoring program read from the ROM 24b. The periphery monitoring unit 30 (periphery monitoring device) includes various modules for realizing a function thereof. The periphery monitoring unit 30 includes, for example, an acquisition unit 32, a generation unit 34, a setting unit 36, a processing unit 38, and the like. Further, the processing unit 38 includes detailed modules such as an own vehicle image acquisition unit 38a, a display mode change unit 38b, a transmittance acquisition unit 38c, a color combination unit 38d, an overlapping unit 38e, an output unit 38f, and the like.

Figure 4:
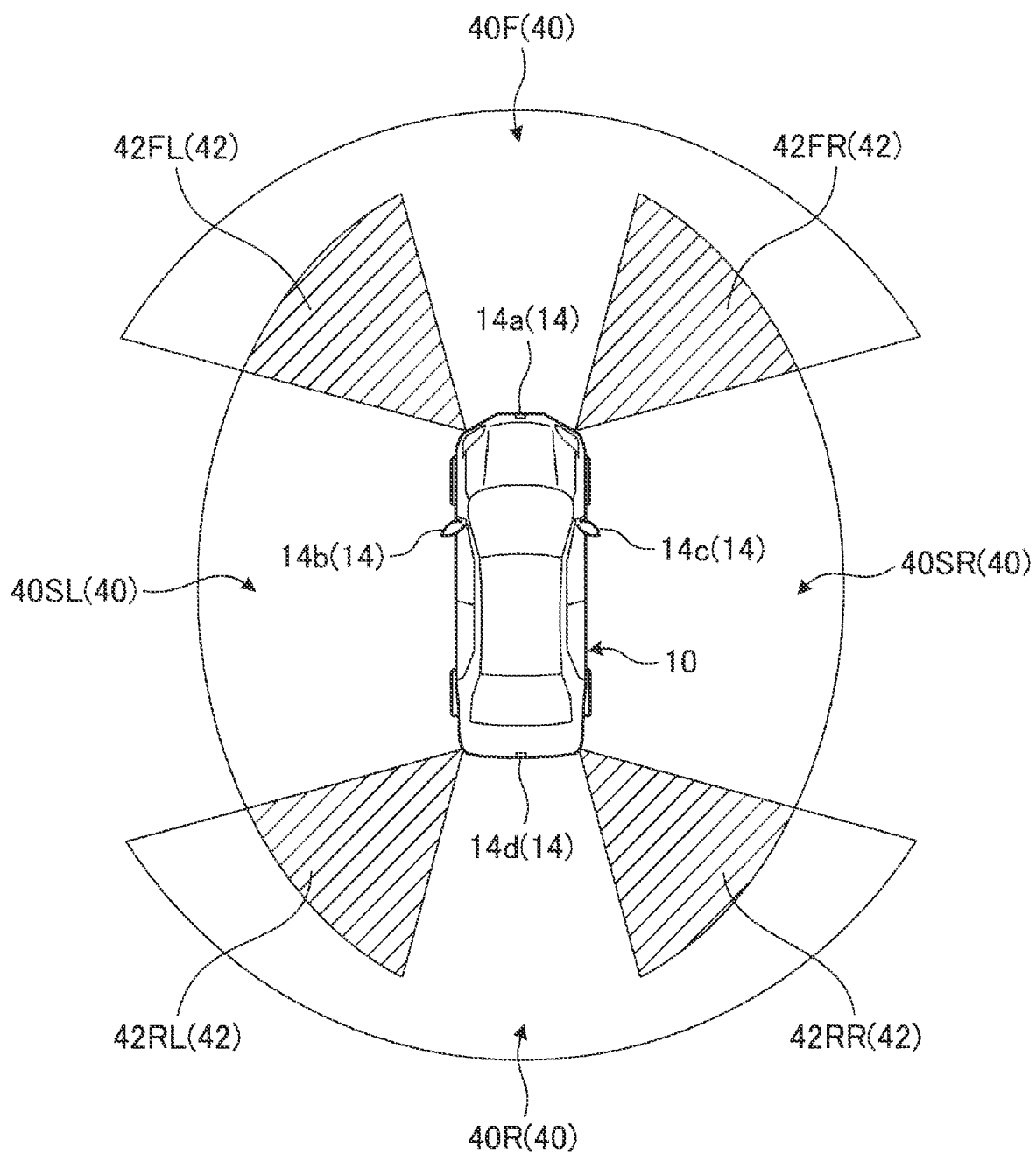
FIG. 4 is an exemplary and schematic bird's-eye view explaining imaging target areas to be imaged by respective imaging units and overlapping areas thereof in the periphery monitoring device according to the embodiment.

The acquisition unit 32 acquires the captured image data (captured images) imaged by the respective imaging units 14 via the display controller 24d. Each of the imaging units 14 (14a to 14d) is capable of imaging an imaging target area 40 as illustrated in FIG. 4. Each imaging target area 40 includes an overlapping area 42 in which portions of adjacent imaging target areas 40 overlap each other. By forming the overlapping area 42, no missing area is generated when the imaging target areas 40 are connected to each other. For example, in the imaging target areas 40, the left side in the vehicle width direction of an imaging target area 40F in front of the vehicle 10 imaged by the imaging unit 14a and the vehicle front side of an imaging target area 40SL on the left side of the vehicle 10 imaged by the imaging unit 14b form an overlapping area 42FL. In the imaging target areas 40, the vehicle rear side of the imaging target area 40SL and the left side in the vehicle width direction of an imaging target area 40R behind the vehicle 10 imaged by the imaging unit 14d form an overlapping area 42RL. In the imaging target areas 40, the right side in the vehicle width direction of the imaging target area 40R and the vehicle rear side of an imaging target area 40SR on the right side of the vehicle 10 imaged by the imaging unit 14c form an overlapping area 42RR. Then, in the imaging target areas 40, the vehicle front side of the imaging target area 40SR and the right side in the vehicle width direction of the imaging target area 40F form an overlapping area 42FR. Each imaging unit 14 may attach an identification code for each imaging unit 14 to the captured image data to output the captured image data to the acquisition unit 32, or may attach an identification code that identifies an output source for each captured image data acquired by the acquisition unit 32 side.

Figure 5:
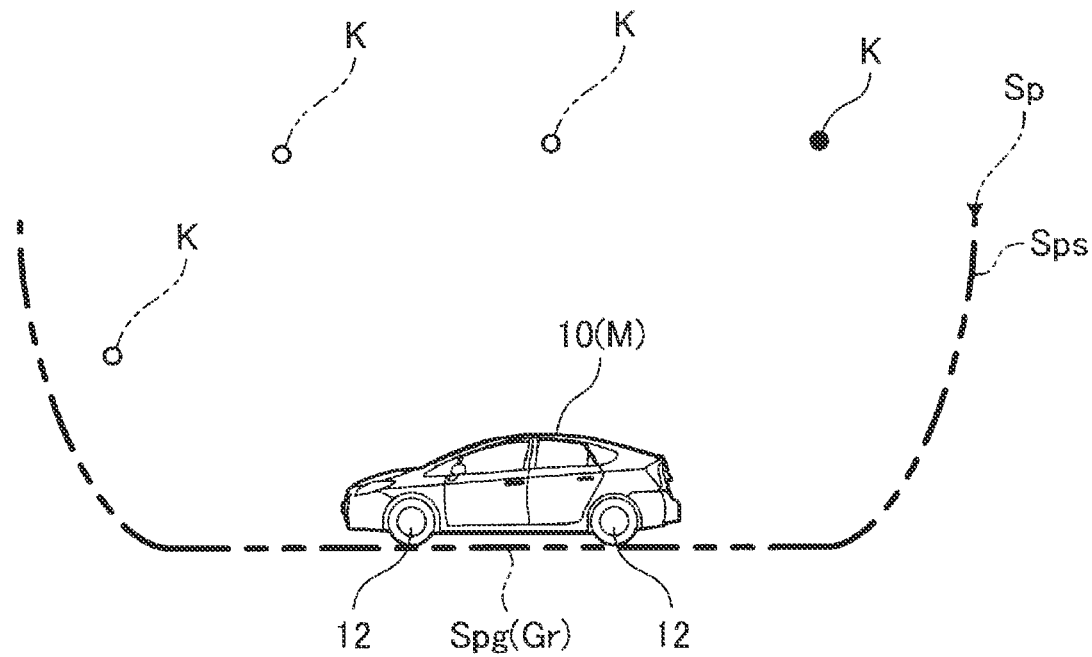
FIG. 5 is an exemplary and schematic explanatory view illustrating a vehicle, a virtual projection plane, and the position of a virtual viewpoint in the periphery monitoring device according to the embodiment.

The generation unit 34 generates a vehicle surrounding image in which the situation around the vehicle 10 is illustrated in a virtual space based on the captured image data (captured images) acquired by the acquisition unit 32. Specifically, as described with reference to FIG. 4, the respective imaging target areas 40 are connected to each other so as to form the overlapping areas 42, so that two-dimensional composite image data indicating the periphery (360°) of the vehicle 10 is created. In addition, in the overlapping areas 42, a blend processing of overlapping captured image data may be executed. For example, in the overlapping area 42FL, a blend processing is executed to blend images using a % of each of the captured image data of the front imaging target area 40F and the captured image data of the left imaging target area 40SL. By executing the blend processing, the front imaging target area 40F and the left imaging target area 40SL are synthesized so as to change gradually, which may make a boundary line caused by the difference in brightness or hue be inconspicuous. Similarly, by executing the blend processing in the other overlapping areas 42, the boundary line may be made inconspicuous in the entire synthesized two-dimensional composite image data. Subsequently, the generation unit 34 reads out a virtual projection plane Sp that is a three-dimensional shape model as illustrated in FIG. 5 and is stored in advance in the ROM 24b or the like. The virtual projection plane Sp is data of a mesh structure in which coordinates X, Y, and Z are defined, and data of each pixel of the synthesized two-dimensional composite image data is projected at the intersection of a mesh (intersection defined by coordinates X, Y, and Z).

The virtual projection plane Sp has, for example, a bottom surface Spg along the ground Gr and a side surface Sps rising from the bottom surface Spg, i.e., the ground Gr as illustrated in FIG. 5. The ground Gr is a horizontal plane orthogonal to the height direction (vertical direction) of the vehicle 10 and is also a ground contact surface of the wheel 12. The bottom surface Spg is, for example, a substantially circular flat surface, and is a horizontal surface on the basis of the vehicle 10. The side surface Sps is, for example, a curved surface that is in contact with the bottom surface Spg and rises in the height direction from a portion of the bottom surface Spg to surround a portion of the bottom surface Spg. As illustrated in FIG. 5, with respect to the side surface Sps, the shape of a virtual cross section when the cross section is taken in the vertical direction (vertical direction of the vehicle 10) is, for example, a part of an elliptical shape or a parabolic shape. The side surface Sps is configured as, for example, a rotating surface around a center line along the height direction with the vehicle 10 as the center. That is, the side surface Sps surrounds the periphery of the vehicle 10. By projecting the two-dimensional composite image data onto the virtual projection plane Sp, it is possible to generate a three-dimensional vehicle surrounding image (data) indicating the surrounding situation with the vehicle 10 as the center. In addition, in another example, the captured image data imaged by the imaging units 14 may be projected onto the virtual projection plane Sp without generating the two-dimensional composite image data. The method of generating the vehicle surrounding image is an example, and a known peripheral image generation technology may be used.

Figure 6:
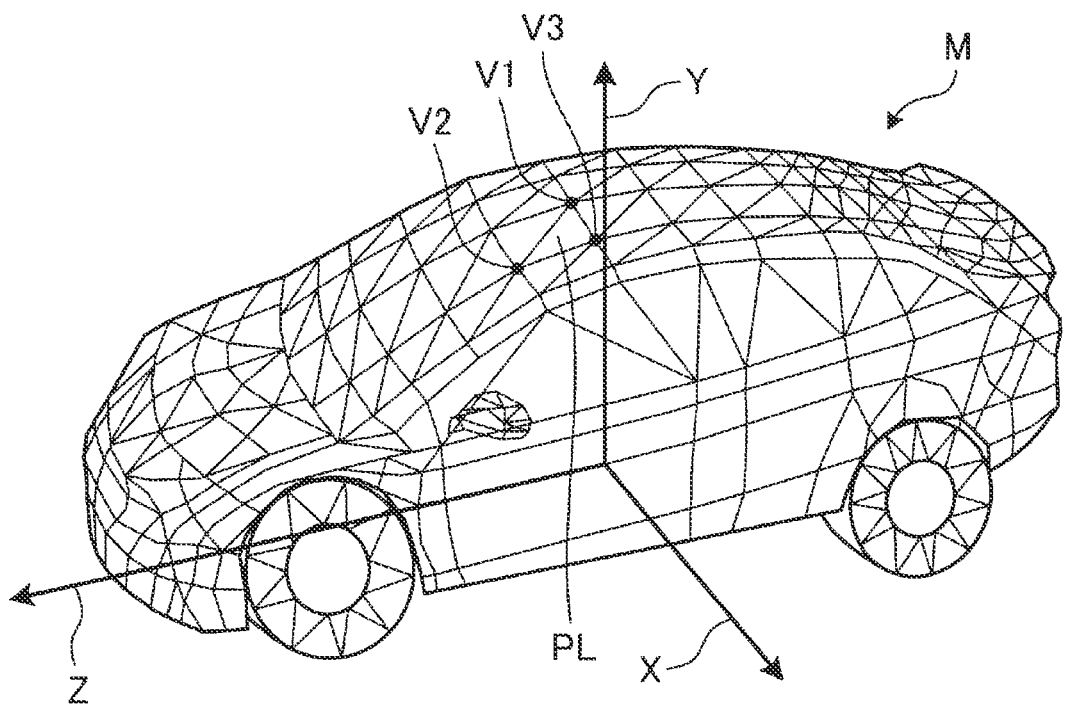
FIG. 6 is an exemplary schematic view of an own vehicle image composed of polygons in the periphery monitoring device according to the embodiment.

Subsequently, as illustrated in FIG. 5, the setting unit 36 sets the position of a virtual viewpoint K facing an own vehicle image M when the own vehicle image M indicating the vehicle 10 is overlapped on the vehicle surrounding image. First, the own vehicle image M will be described. In the present embodiment, as illustrated in FIG. 6, the own vehicle image M may be an image indicating the shape of the vehicle 10, and a constituent plane (surface) of the vehicle 10 may be composed of, for example, multiple polygons PL. That is, the own vehicle image M has a stereoscopic shape (three-dimensional shape) displayed by the multiple polygons PL (in the present embodiment, mainly triangular polygons PL). Thus, the own vehicle image M with further reality may be displayed. Further, the own vehicle image M composed of the multiple polygons PL is rotatable with respect to each of the X-axis, the Y-axis, and the Z-axis, so that the own vehicle image M may be directed in a desired direction. In addition, the X-axis is an axis corresponding to the vehicle width direction of the own vehicle image M, the Z-axis is an axis corresponding to the traveling direction of the own vehicle image M, and the Y-axis is an axis corresponding to the height (vertical) direction of the own vehicle image M. Thus, as illustrated in FIG. 5, when the own vehicle image M is overlapped on the generated three-dimensional vehicle surrounding image, the direction of the own vehicle image M may be directed to the direction as viewed from the virtual viewpoint K so as to correspond to movement of the position of the virtual viewpoint K facing the own vehicle image M. The position of the virtual viewpoint K may be continuously changed by, for example, the user (e.g., a driver) of the periphery monitoring device using a joystick or the like provided on the operation input unit 20 or the monitor device 22, and the virtual viewpoint K may be set to a specific position. FIG. 5 illustrates an example of the set position of the virtual viewpoint K. For example, the virtual viewpoint K may be set to a higher position than the bottom surface Spg (ground Gr) in the entire peripheral area (360°) about the own vehicle image M such as the upper position, the side position, or the front position of the own vehicle image M.

The processing unit 38 displays, on the display device 16, an image in which the own vehicle image indicating the vehicle 10 in which the transmissive state of the constituent plane representing a plane constituting the vehicle 10 is determined according to the direction of the constituent plane is overlapped on the vehicle surrounding image represented based on the virtual viewpoint facing the vehicle 10 in a virtual space. In order to execute such a processing, as described above, the processing unit 38 includes the own vehicle image acquisition unit 38a, the display mode change unit 38b, the transmittance acquisition unit 38c, the color combination unit 38d, the overlapping unit 38e, and the output unit 38f and the like.

The own vehicle image acquisition unit 38a reads out the own vehicle image M (three-dimensional shape model) as illustrated in FIG. 6 from a storage unit such as the ROM 24b. The own vehicle image M is an image that may be created by a well-known technology, and a surface (constituent plane) corresponding to the shape of the vehicle 10 is formed by polygons PL (triangular or quadrangular polygons).

The display mode change unit 38b determines the display size of the own vehicle image M according to the position of the virtual viewpoint K set by the setting unit 36. That is, the display mode change unit 38b adjusts the own vehicle image M to expand or contract the own vehicle image M to a display size corresponding to the zoom state based on the position of the virtual viewpoint K. Further, the display mode change unit 38b determines the display posture of the own vehicle image M according to the position of the virtual viewpoint. The display posture of the own vehicle image M may be determined by rotational adjustment with respect to each of the X-axis, the Y-axis, and the Z-axis. In addition, the display mode change unit 38b does not draw a constituent plane that is the back surface side of the own vehicle image M with respect to the virtual viewpoint K. That is, when viewing the own vehicle image M from the virtual viewpoint K, the display mode change unit 38b draws only a constituent plane of a visible portion to determine the display mode of the own vehicle image M.

Figure 7:
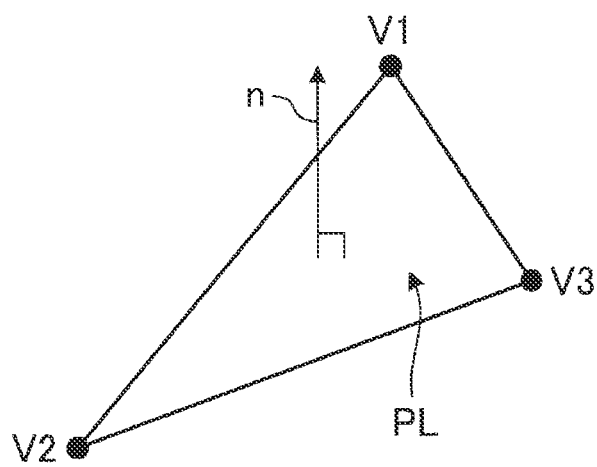
FIG. 7 is an exemplary and schematic explanatory view explaining a normal vector of an individual plane of a polygon in the periphery monitoring device according to the embodiment.

As described above, when the own vehicle image M is overlapped on the vehicle surrounding image, a portion of the vehicle surrounding image is hidden by the own vehicle image M. That is, since an object or the like existing in the hidden blocked area is not displayed, it is impossible to sufficiently check the surrounding situation. Therefore, the transmittance acquisition unit 38c determines the transmissive state of a constituent plane (individual plane of each polygon PL) constituting the own vehicle image M according to the direction of the constituent plane. Specifically, when the polygon PL of a constituent plane constituting an arbitrary position in the own vehicle image M is a triangle as illustrated in FIG. 7, the transmittance acquisition unit 38c defines the individual plane of the polygon PL as, for example, a closed region surrounded by vertices V1, V2, and V3. Then, the transmittance acquisition unit 38c acquires a value in the Y-axis direction (see FIG. 6) of a normal vector n perpendicular to the individual plane of the polygon PL (a vector component in the normal direction of the horizontal plane in the vehicle surrounding image: hereinafter referred to as a Y-component). Then, the transmittance acquisition unit 38c determines the transmittance of the polygon PL based on the Y-component of the normal vector n.

Specifically, the transmittance acquisition unit 38c increases the transmissive state of the individual plane as the direction in which the individual plane of the polygon PL faces is closer to, for example, the direction of the road surface. Conversely, the transmittance acquisition unit 38c reduces the transmissive state of the individual plane as the direction in which the individual plane of the polygon PL faces is closer to the direction perpendicular to the road surface. For example, the individual plane of the polygon PL is assumed to be in an opaque state (non-transmissive state) due to reflection of coloring by the body color or the like of the vehicle 10 when the transmittance is "0." Conversely, the individual plane of the polygon PL is assumed to be in a transparent state (transmissive state) without reflection of coloring when the transmittance is "1." Accordingly, when the transmittance of the individual plane of the polygon PL is changed by the Y-component of the normal vector n of the individual plane of the polygon PL, the transmissive state may be changed according to the direction in which the individual plane of the polygon PL faces. For example, the transmittance is obtained from a vector value in the Y-axis direction of the normal vector n (unit vector) (Equation 1).

$$\text{Transmittance} = |Y \text{ vector value}|^5 \quad \text{Equation 1}$$

For example, since a ceiling portion of the own vehicle image M is close to the direction of the road surface, the Y vector value of the normal vector n is close to "1." As a result, transmittance=$|Y \text{ vector value} \approx 1|^5 \approx 1$ is established. Thus, the transmittance of the individual plane of the polygon PL has a value close to "1," so that the individual plane is in a high transmissive state and is transparent. Similarly, since a bonnet portion of the own vehicle image M is gently inclined but is close to the direction of the road surface similarly to the ceiling portion, the transmittance of the individual plane of the polygon PL of the bonnet portion has a value close to "1," so that the individual plane is in the transmissive state and is transparent. This is also equally applied to a front window portion.

Conversely, since a side surface portion of the own vehicle image M on the virtual viewpoint K side is in a state close to the direction perpendicular to the road surface, the Y vector value of the normal vector n of the individual plane of the polygon PL is close to "0." As a result, transmittance=$|Y \text{ vector value} \approx 0|^5 \approx 0$ is established. Thus, the transmittance of the individual plane of the polygon PL has a value close to "0," so that the individual plane is in a low transmissive state and the constituent plane of the surface of the own vehicle image M is displayed. Similarly, since the vicinity of a rear bumper in a rear portion of the own vehicle image M is close to the direction perpendicular to the road surface, the transmittance of the individual plane of the polygon PL has a value close to "0," so that the individual plane is in a low transmissive state and the constituent plane of the own vehicle image M is displayed. For example, when the vector component in the normal direction of the individual plane is substantially orthogonal to, for example, the normal (vector) of the horizontal plane in the vehicle surrounding image, the transmittance acquisition unit 38c displays the individual plane rather than displaying the individual plane in the transmissive state. In addition, a side portion or a rear portion that is visible from the virtual viewpoint K, i.e., the side surface or the like of the own vehicle image M existing on the side close to the virtual viewpoint K is in a low transmissive state, but the area hidden by that portion is generally a ground portion where the own vehicle image M (vehicle 10) exists. That is, it can be considered that an object that the driver of the vehicle 10 needs to pay attention may not exist in the blocked portion. Thus, regarding the portion where it is less necessary for the user to pay attention, the shape of the own vehicle image M may be clarified by making the own vehicle image M opaque. As a result, a positional relationship (distance relationship) between the surrounding situation and the own vehicle image M (vehicle 10) may be more easily recognized. In addition, since the direction of the individual plane of the polygon PL gradually changes in a connection portion between the ceiling portion and the side surface portion, the transmittance also gradually changes. As a result, the transmissive state of the connection portion changes, so that the contour of the own vehicle image M may be displayed. In this way, since the user (driver) may clearly grasp the shape (contour) of the own vehicle image M, the direction in which the vehicle 10 faces may be displayed so as to be easily understood.

In addition, the above-described equation of transmittance=$|Y \text{ vector value}|^5$ is an example, and for example, the multiplier may be changed or any other equation may be used as appropriate as long as the transmittance of the individual plane of the polygon PL may be changed as described above by changing the Y vector value. In addition, the normal vector n of the individual plane of the multiple polygons PL which form the constituent plane of the own vehicle image M may be determined in advance so as to correspond to the shape of the own vehicle image M. Thus, the transmittance with respect to the normal vector n of the individual plane of each polygon PL in the own vehicle image M may be calculated in advance and may be stored in a storage unit such as the ROM 24b. Then, the transmittance acquisition unit 38c may read out and use the transmittance from the ROM 24b when determining the transmissive state of the individual plane of each polygon PL in the own vehicle image M. Further, in another embodiment, the transmittance acquisition unit 38c may calculate the transmittance of the individual plane of each polygon PL whenever the transmittance is determined. Further, a small protrusion such as a door mirror may have a constant transmittance. Further, the transmittance may be further increased as the distance between the position of the virtual viewpoint K and each polygon PL is increased.

The color combination unit 38d colors, in a predetermined color, the own vehicle image M for which the transmissive state has been determined. For example, the own vehicle image M is colored in a color corresponding to the body color of the vehicle 10. As described above, when the transmittance is "0" and the color combination unit 38d executes a coloring processing, the individual plane of the polygon PL is colored and becomes an opaque state (non-transmissive state) due to reflection of coloring. Conversely, when the transmittance is "1" and the color composition unit 38d executes a coloring processing, the individual plane of the polygon PL becomes a transparent state (transmissive state) without reflection of coloring. The constituent plane of the own vehicle image M is a continuous plane and the direction of the individual plane of the polygon PL changes continuously. Thus, the Y-component of the normal vector n of the individual plane of the polygon PL also changes continuously, and the transmittance also changes continuously. As a result, the transmissive state of the own vehicle image M also changes continuously and smoothly. In addition, the color combination unit 38d may change the color to be colored on the own vehicle image M according to the brightness around the vehicle 10. For example, at night, the vehicle surrounding image generated by the generation unit 34 tends to be dark. In that case, the own vehicle image M may be colored in a color that is easily distinguishable from the vehicle surrounding image regardless of the color of the vehicle 10. Further, for example, the user may be able to change the color to be colored by operating the operation input unit 20.

In addition, when the own vehicle image M is overlapped on the vehicle surrounding image, the color combination unit 38d displays a shadow image corresponding to the own vehicle image M when the own vehicle image M is viewed from directly above thereof so as to be overlapped on the vehicle surrounding image immediately below the own vehicle image M. In this case, the shadow image may clarify the range in which the own vehicle image M (vehicle 10) exists, i.e., the range in which the vehicle 10 exists and therefore, an object such as an obstacle that the driver needs to pay attention may not exist. For example, the color combination unit 38d determines an area where the shadow image is displayed so as to correspond to the position of the virtual viewpoint K set by the setting unit 36, and displays the portion by coloring the portion, for example, in black. Further, by displaying the shadow image, an edge portion (e.g., a corner portion or the like) of the own vehicle image M may be clarified, and a positional relationship between the own vehicle image and an object existing around the own vehicle image M may be further clearly understood by the user.

The overlapping unit 38e overlaps the own vehicle image M which has the display mode determined by the display mode change unit 38b and the transmissive state determined by the transmittance acquisition unit 38c and on which the coloring processing has been executed by the color combination unit 38d on the vehicle surrounding image generated by the generation unit 34 to generate a composite image. Then, the output unit 38f outputs the generated composite image to the display device 16 via the display controller 24d to display the composite image on the display device 16.

FIGS. 8 to 11 illustrate an exemplary and schematic display screen 44 displayed on the display device 16 in which the own vehicle image M is overlapped on the vehicle surrounding image. FIGS. 8 to 11 illustrate examples of the display screen 44 when the position of the virtual viewpoint K is changed.

Figure 8:
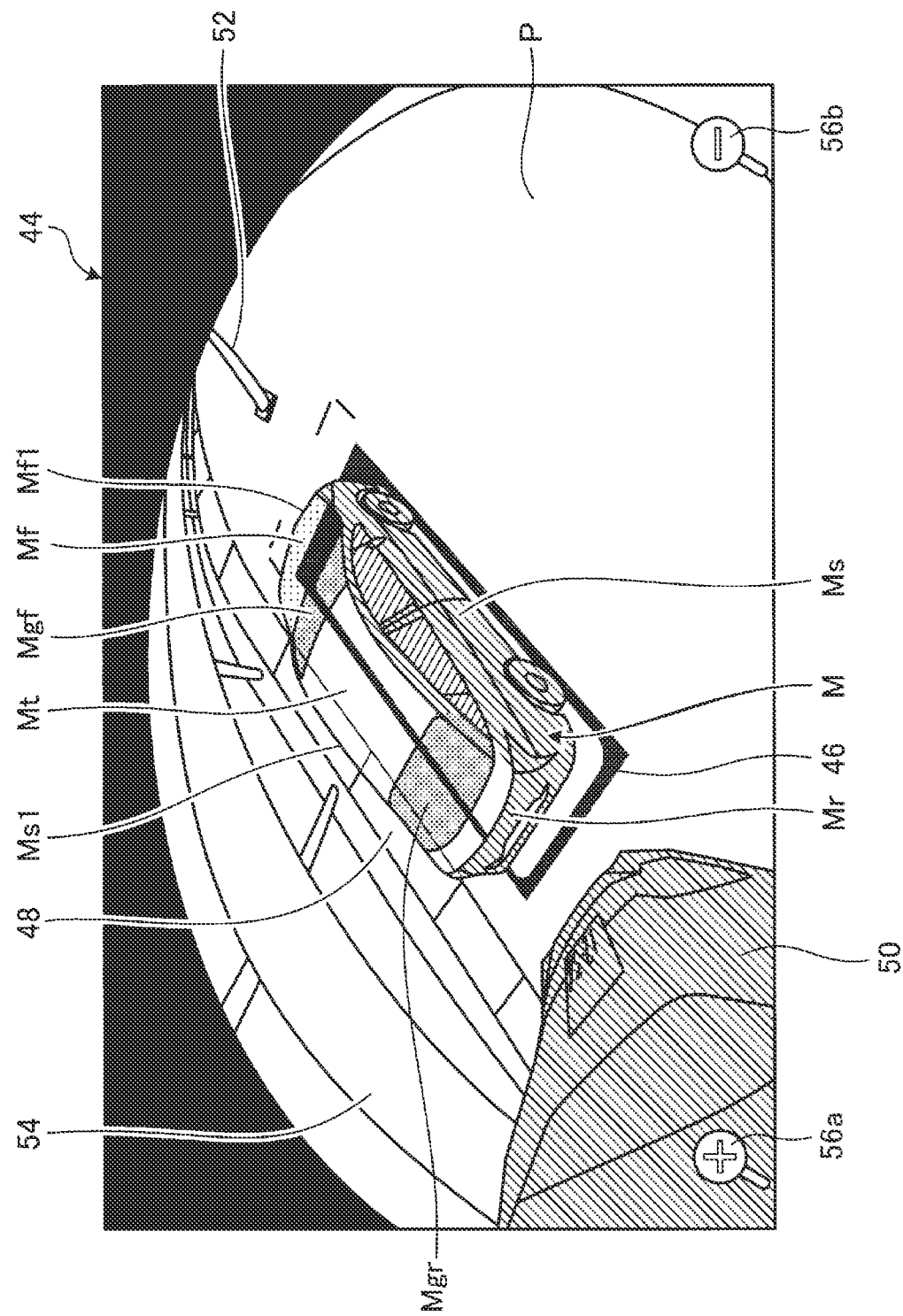
FIG. 8 is a view illustrating an exemplary and schematic display screen displayed on a display device in which an own vehicle image is overlapped on a vehicle surrounding image in the periphery monitoring device according to the embodiment.

FIG. 8 illustrates the display screen 44 when the virtual viewpoint K is set to an upper position obliquely rearward to the right side of the own vehicle image M. In a vehicle surrounding image P, the own vehicle image M with a shadow image 46 is displayed, and a side groove 48 with a lid, another vehicle 50, a pole 52, a guardrail 54 and the like which exist around the own vehicle image M (vehicle 10) are reflected. Then, the own vehicle image M is displayed in the transmissive state determined for each individual plane of the polygon PL by the processing of the processing unit 38 described above. For example, a ceiling portion Mt, a bonnet portion Mf, a front window Mgf, and a rear window Mgr which are close to the direction of the road surface are displayed respectively in the determined transmissive state. In a case of FIG. 8, the transmissive state is, for example, Mt>Mf>Mgr>Mgf in the descending order of transmittance. As a result, the side groove 48 with the lid on the left side of the own vehicle image M which is originally hidden by overlapping the own vehicle image M on the vehicle surrounding image P is displayed in a transparent state. Further, a right side surface portion Ms or a rear portion Mr (the vicinity of a rear bumper) of the own vehicle image M which is close to the direction perpendicular to the road surface is displayed in a low transmissive state (substantially non-transmissive state), and the outer shape of the own vehicle image M is clearly displayed. In addition, since the Y-component of the normal vector n in a connection portion between the ceiling portion Mt and a left side surface portion of the own vehicle image M gradually changes toward the left side surface portion so as to become smaller, the connection portion is displayed in a low transmissive state as a side contour line Ms1 and the left side contour of the own vehicle image M is displayed. Similarly, since the Y-component of the normal vector n in a connection portion between the bonnet portion Mf and a front portion of the own vehicle image M gradually changes toward the front portion so as to become smaller, the connection portion is displayed in a low transmissive state as a front contour line Mf1 and the front side contour of the own vehicle image M is displayed.

Accordingly, with the periphery monitoring device of the present embodiment, as illustrated in FIG. 8, the shape (contour) of the own vehicle image M may be sufficiently displayed while sufficiently displaying the blocked area hidden by the own vehicle image M (e.g., a portion of the left side groove 48 with the lid of the own vehicle image M). As a result, display is realized to make it easy to intuitively grasp a relationship between the own vehicle image M (vehicle 10) and the surroundings. Further, the situation around the vehicle 10 may be provided to the user (driver), for example, without using an obstacle detection sensor such as a sonar, i.e., without detecting an obstacle, and this makes it easy for the user to accurately recognize the presence or absence of an obstacle. In addition, since the shadow image 46 which is a projection image indicating the size of the own vehicle image M is displayed below the own vehicle image M, the size of a gap between the left end of the own vehicle image M and, for example, the guard rail 54 may be displayed, and display may be made to allow the user to easily grasp the sense of the distance of the vehicle 10 with respect to the guard rail 54.

In addition, an icon 56a which performs zoom-in of the vehicle surrounding image P and an icon 56b which performs zoom-out of the vehicle surrounding image P may be displayed on the lower end of the vehicle surrounding image P, so that the vehicle surrounding image P may be displayed in a display size according to the user's desire.

Figure 9:
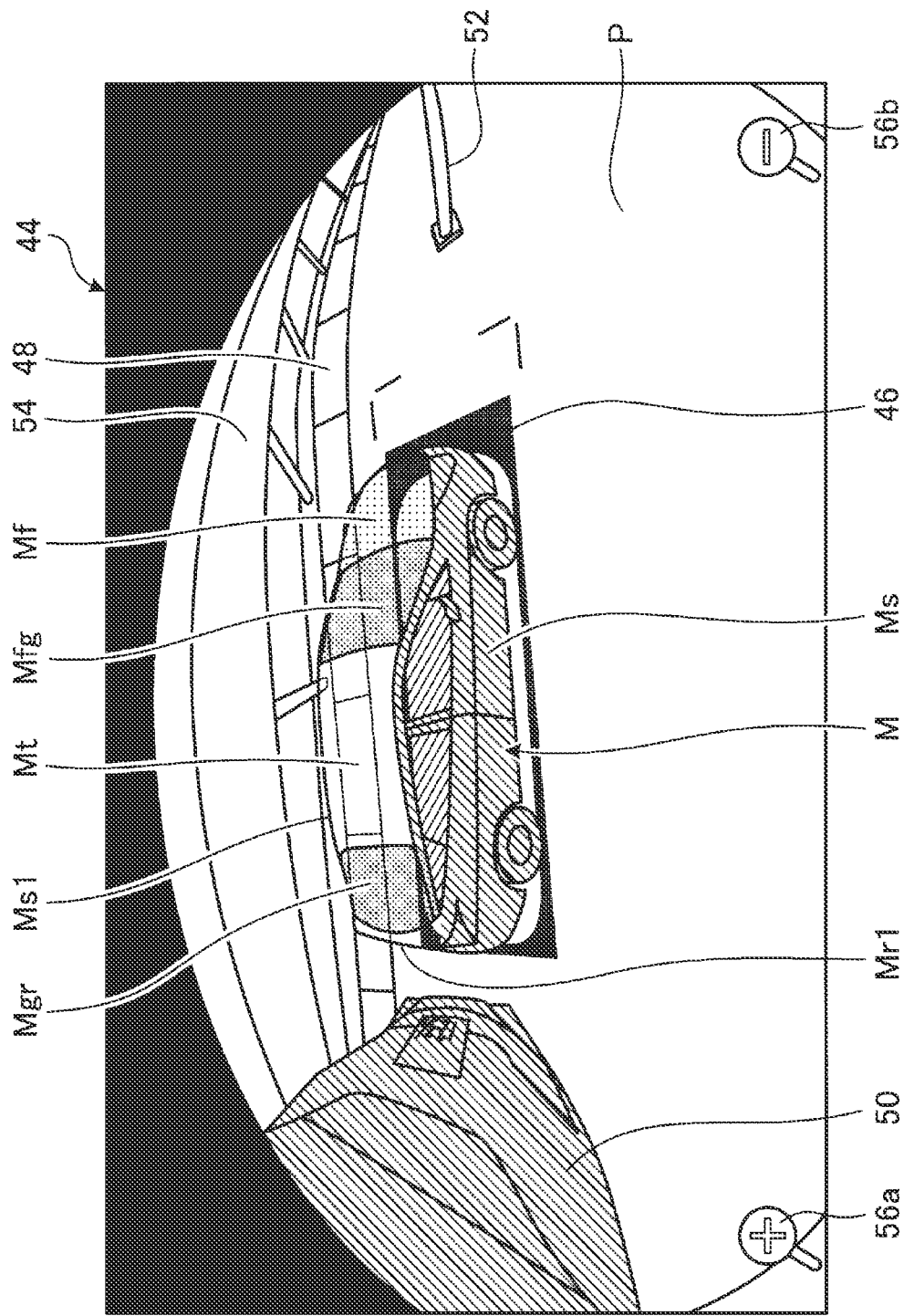
FIG. 9 is a view illustrating another exemplary and schematic display screen displayed on the display device in which the own vehicle image is overlapped on the vehicle surrounding image in the periphery monitoring device according to the embodiment.

FIG. 9 is an example of the display screen 44 when the setting unit 36 sets the position of the virtual viewpoint K to an upper position on the right side of the own vehicle image M. In a case of FIG. 9 as well, similarly to the case of FIG. 8, the own vehicle image M is also displayed in the transmissive state determined for each individual plane of the polygon PL by the processing of the processing unit 38.

For example, the ceiling portion Mt, the bonnet portion Mf, the front window Mgf, and the rear window Mgr which are close to the direction of the road surface are displayed respectively in the determined transmissive state. In the case of FIG. 9, the transmissive state is also, for example, Mt>Mf>Mgr>Mgf in the descending order of transmittance. As a result, the side groove 48 with the lid on the left side of the own vehicle image M which is originally hidden by overlapping the own vehicle image M on the vehicle surrounding image P is displayed in a transparent state. In the case of FIG. 9, the blocked area on the left side of the own vehicle image M hidden by the own vehicle image M is widened, but the side groove 48 with the lid included in the blocked area is clearly displayed since the blocked area is displayed in the transmissive state. Further, the shape (contour) of the own vehicle image M is sufficiently displayed by, for example, display with low transmittance of the side surface portion Ms on the virtual viewpoint K side or by the side contour line Ms1 or the rear contour line Mr1, so that display is realized to make it easy to intuitively grasp a relationship between the own vehicle image M (vehicle 10) and the surroundings. Further, even by display of the shadow image 46, display is realized to make it easy to intuitively grasp a relationship between the end of the own vehicle image M and the surroundings (a relationship between the end and the side groove 48 with the lid, the other vehicle 50, the guard rail 54, and the like). As described above, in the case of the display screen 44 illustrated in FIG. 9, whether or not there exists an obstacle in the surrounding situation of the vehicle 10, particularly on the opposite side of the virtual viewpoint K (on the left side of the own vehicle image M (vehicle 10)) or a distance relationship between the own vehicle and an obstacle when there is the obstacle may be clearly displayed and may be provided to the user (driver), for example, without using an obstacle detection sensor such as a sonar (without detecting an obstacle). As a result, it makes it easy for the user to more appropriately determine the surrounding situation of the vehicle 10.

Figure 10:
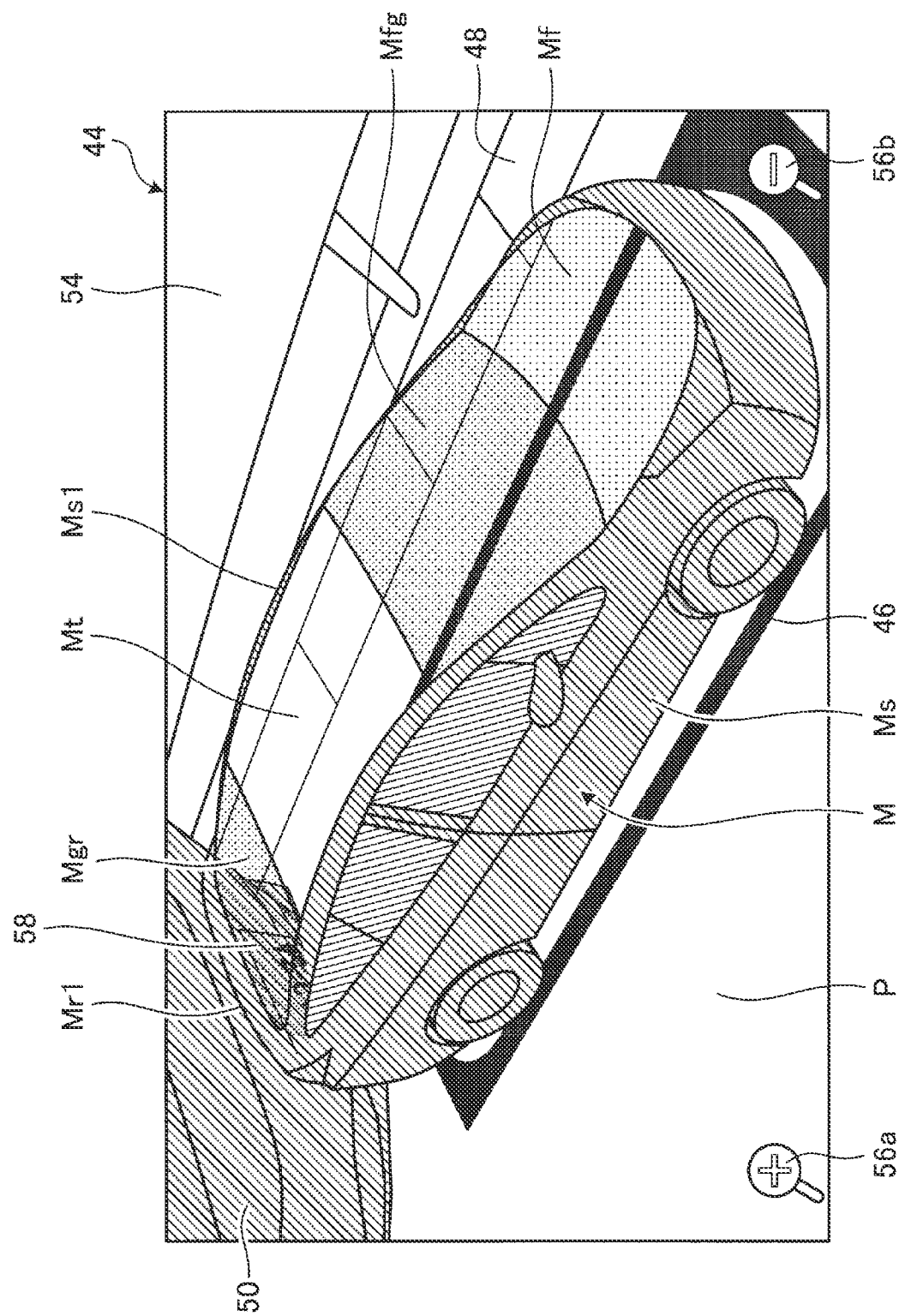
FIG. 10 is a view illustrating still another exemplary and schematic display screen displayed on the display device in which the own vehicle image is overlapped on the vehicle surrounding image in the periphery monitoring device according to the embodiment.

FIG. 10 illustrates a case where the position of the virtual viewpoint K is set by the setting unit 36 to an upper position obliquely forward to the right side of the own vehicle image M, and is an example of the display screen 44 in a zoom-up state compared to the display example of FIG. 8 or FIG. 9 by the icon 56a. In the case of FIG. 10 as well, similarly to the case of FIG. 8 or FIG. 9, the own vehicle image M is displayed in the transmissive state determined for each individual plane of the polygon PL by the processing of the processing unit 38. For example, the ceiling portion Mt, the bonnet portion Mf, the front window Mgf, and the rear window Mgr which are close to the direction of the road surface are displayed respectively in the determined transmissive state. In the case of FIG. 10, the transmissive state is also, for example, Mt>Mf>Mgr>Mgf in the descending order of transmittance. As a result, the side groove 48 with the lid on the left side of the own vehicle image M which is originally hidden by overlapping the own vehicle image M on the vehicle surrounding image P is displayed in a transparent state. Further, since the rear window Mgr is in the transmissive state, a number plate 58 of the other vehicle 50 existing behind the own vehicle image M may be clearly displayed and may be easily recognized by the user. Further, since the shape (contour) of the own vehicle image M is sufficiently displayed by non-transmission display of the side surface portion Ms on the virtual viewpoint K side or by the side contour line Ms1 or the rear contour line Mr1 and the like, and the area occupied by the own vehicle image M (vehicle 10) is clearly displayed by the shadow image 46, display is realized to make it easy to intuitively grasp a relationship between the own vehicle image M (vehicle 10) and the surroundings, particularly a positional relationship between the own vehicle image M and the other vehicle 50 behind thereof. As described above, by displaying the display screen 44 in an enlarged scale, the surrounding situation of the own vehicle image M (vehicle 10) (the situation of the side groove 48 with the lid, the other vehicle 50, the guard rail 54, and the like) may be displayed in more detail so as to be easily understood, for example, without using an obstacle detection sensor such as sonar (without detecting an obstacle).

The side surface portion Ms of the own vehicle image M is displayed in a lower transmissive state compared to other portions. As illustrated in FIGS. 8 to 10, the side surface portion Ms may be overlapped on the area corresponding to the bottom of the vehicle 10 in the vehicle surrounding image P. For this reason, there is a low possibility that an obstacle existing around the vehicle 10 imaged by the respective imaging units 14 is hidden by the side surface portion Ms. Accordingly, in the present embodiment, both the ease of recognizing the vehicle 10 and the ease of recognizing the obstacle around the vehicle 10 may be achieved.

Figure 11:
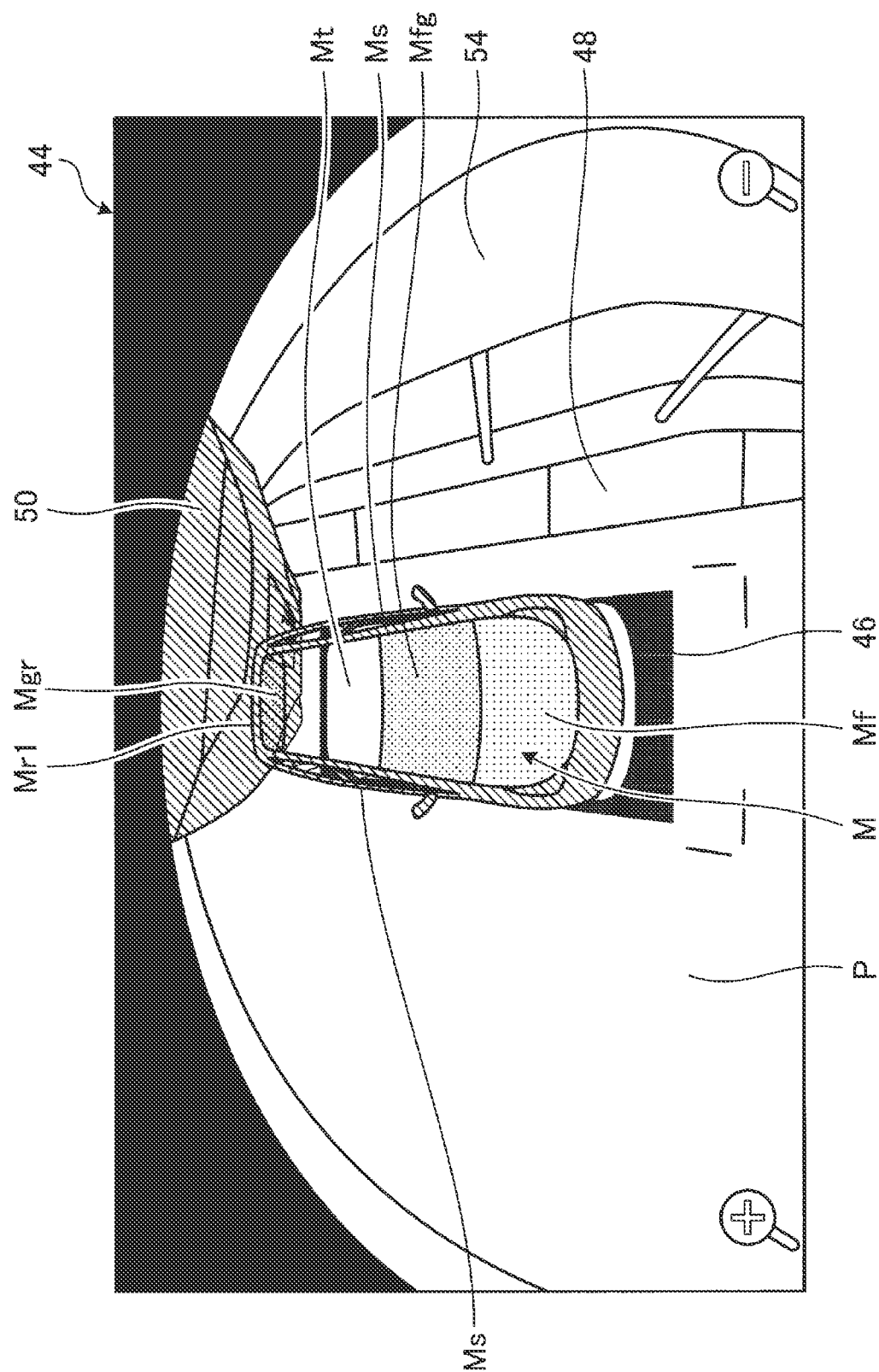
FIG. 11 is a view illustrating a further exemplary and schematic display screen displayed on the display device in which the own vehicle image is overlapped on the vehicle surrounding image in the periphery monitoring device according to the embodiment.

FIG. 11 is an example of the display screen 44 when the position of the virtual viewpoint K is set by the setting unit 36 to an upper position in front of the own vehicle image M. In a case of FIG. 11 as well, similarly to other display examples, the own vehicle image M is displayed in the transmissive state determined for each individual plane of the polygon PL by the processing of the processing unit 38. For example, the ceiling portion Mt, the bonnet portion Mf, the front window Mgf, and the rear window Mgr which are close to the direction of the road surface are displayed respectively in the determined transmissive state. In the case of FIG. 11, the transmissive state is also, for example, Mt>Mf>Mgr>Mgf in the descending order of transmittance. As a result, the other vehicle 50 behind the own vehicle image M which is originally hidden by overlapping the own vehicle image M on the vehicle surrounding image P is displayed in a transparent state. In the case of FIG. 11, since rear captured image data is projected on the virtual projection plane Sp which is a three-dimensional shape model, the other vehicle 50 is displayed in a state of extending in the longitudinal and transverse directions, but a portion thereof having a possibility of coming into contact with the vehicle 10 may be displayed by transmission. Therefore, display is realized to make it easy to intuitively grasp a relationship between the own vehicle image M (vehicle 10) and the other vehicle 50.

In addition, the display screens 44 in FIGS. 8 to 11 are examples, and by moving the position of the virtual viewpoint K set by the setting unit 36 by an operation of the operation input unit 20 and the like, the own vehicle image M may be displayed in various directions and the blocked area hidden by the own vehicle image M may be displayed in the transmissive state. Further, in the above-described embodiment, an example in which the periphery monitoring unit 30 is operated in a so-called "manual display mode" in which the setting unit 36 sets the position of the virtual viewpoint K to a specified position has been illustrated. In another embodiment, an "automatic display mode" in which the setting unit 36 moves the virtual viewpoint K according to a preset movement pattern to allow the user to check the surrounding situation while turning around the own vehicle image M may be executed.

Figure 12:
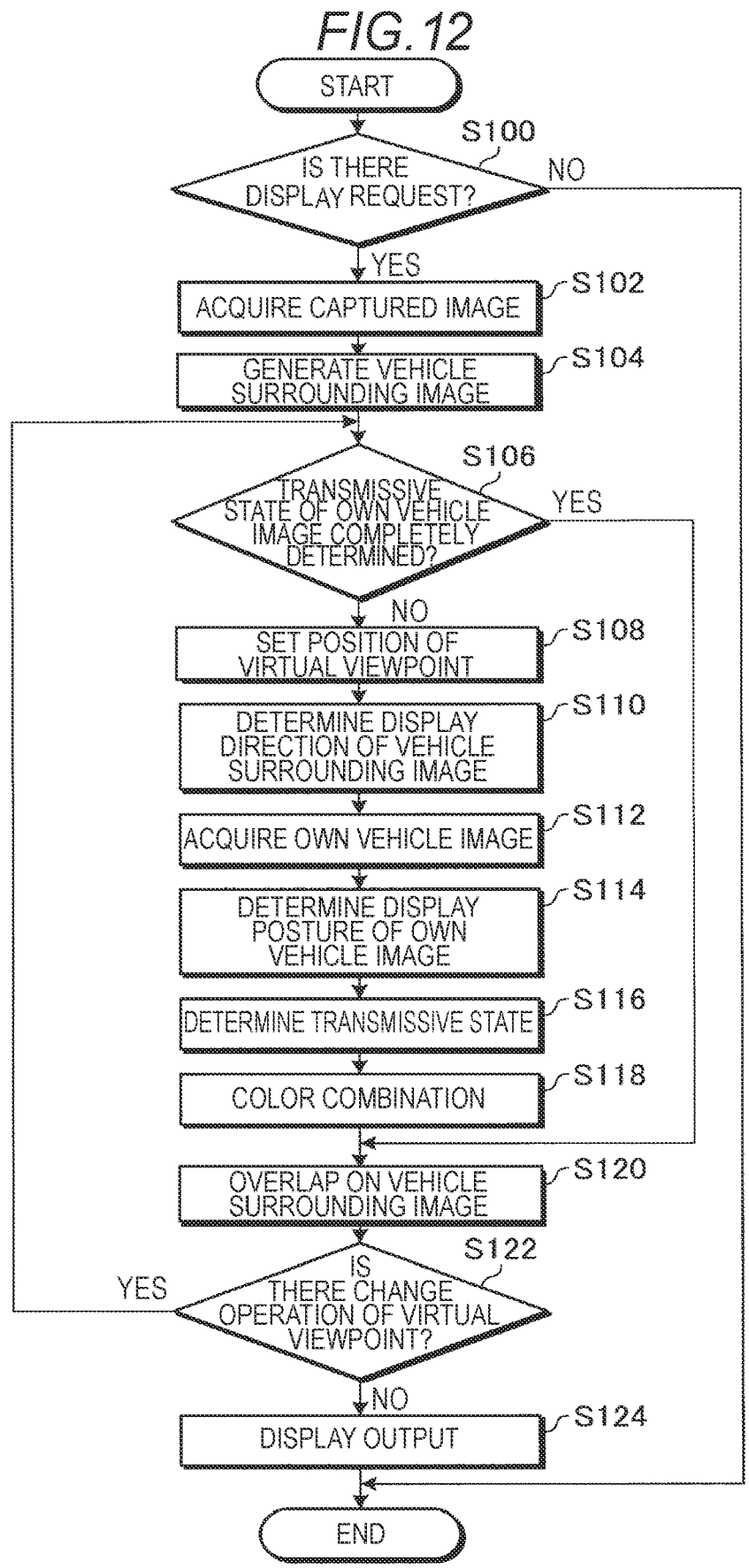
FIG. 12 is a flowchart illustrating an example of the flow of an image display processing in the periphery monitoring device according to the embodiment.

An example of the flow of an image display processing by the periphery monitoring device (periphery monitoring unit 30) configured as described above will be described with reference to the flowchart of FIG. 12. In addition, the flowchart of FIG. 12 is repeatedly executed at a predetermined processing cycle when the vehicle 10 is powered on.

First, the periphery monitoring unit 30 checks whether or not the user has requested the transmission display of the own vehicle image M by operating the operation input unit 20 and the like (S100). When there is no request (No in S100), this flow is once terminated. On the other hand, when the periphery monitoring unit 30 checks a request for the transmission display of the own vehicle image M (Yes in S100), the acquisition unit 32 acquires captured image data (captured images) around the vehicle 10 imaged by the respective imaging units 14 (S102). Subsequently, the generation unit 34 projects the current captured image data (captured images) acquired by the acquisition unit 32 onto the virtual projection plane Sp which is a three-dimensional shape model read from the ROM 24b to generate the vehicle surrounding image P indicating the surrounding situation of the vehicle 10 (S104).

Subsequently, the transmittance acquisition unit 38c determines whether or not the transmissive state of the own vehicle image M has been completely determined (S106). When the transmissive state of the own vehicle image M has not yet been determined (No in S106), the setting unit 36 displays, for example, a message having the intent of designating the position of the virtual viewpoint K on the display device 16 and causes the user to designate the position of the virtual viewpoint K by the operation input unit 20 and the like to set the position of the virtual viewpoint K (S108). In addition, the position of the virtual viewpoint K may be a default value, and may be changed after the following processing is executed and the display screen 44 illustrated in FIG. 8 is displayed. The setting unit 36 determines the display direction of the vehicle surrounding image P according to the set position of the virtual viewpoint K (S110). For example, it is determined whether the own vehicle image M is displayed so as to look down from above at the rear right side as illustrated in FIG. 8, or whether the own vehicle image M is displayed so as to look down from above at the front side as illustrated in FIG. 11.

Subsequently, the own vehicle image acquisition unit 38a acquires data of the own vehicle image M from a storage unit such as the ROM 24b (S112), and determines the display posture of the own vehicle image M according to the position of the virtual viewpoint K set by the setting unit 36 (S114). In this case, when the user designates a zoom state or the like using the operation input unit 20 and the like, the display mode change unit 38b determines the display size of the own vehicle image M or the zoom state of the vehicle surrounding image P according to the designation.

Then, the transmittance acquisition unit 38c determines the transmissive state of the own vehicle image M according to the transmittance of the individual plane of each polygon PL set by the setting unit 36 (S116). Then, the color combination unit 38d executes color combination of coloring the own vehicle image M, for example, in a color corresponding to the body color of the vehicle 10 (S118). Then, the overlapping unit 38e overlaps the color-combined own vehicle image M on the vehicle surrounding image P generated by the generation unit 34 (S120) to complete the display screen 44 illustrated in FIGS. 8 to 11 to be displayed on the display device 16. Then, the output unit 38f checks whether or not the user is performing an operation of changing the virtual viewpoint K via the operation input unit 20 and the like (S122), and when there is no change operation (No in S122), outputs the display screen 44 completed in S120 to the display controller 24d (S124) so as to be displayed on the display device 16, and this flow is once terminated. In S122, when the output unit 38f determines that an operation of changing the position of the virtual viewpoint K has been performed (Yes in S122), this flow proceeds to S106. In this case, since the transmissive state of the own vehicle image M changes with a change in the position of the virtual viewpoint K, the setting unit 36 sets the position of the virtual viewpoint K again, and repeats the processings after S108. In addition, in a next processing cycle, when the transmissive state of the own vehicle image M has been completely determined in the previous processing in S106 (Yes in S106), this flow proceeds to S120, and the own vehicle image M, the transmissive state of which has been completely determined, is overlapped on the current vehicle surrounding image P. That is, a real-time periphery monitoring image (display screen 44) in which the own vehicle image M is overlapped on the latest vehicle surrounding image P is displayed on the display device 16.

As described above, according to the periphery monitoring device of the embodiment, the visibility of a portion hidden by the own vehicle image M may be improved without performing obstacle detection using an obstacle detection sensor and the like, and display may be realized to make it easy to intuitively grasp a relationship between the own vehicle image (vehicle 10) and the surroundings.

Figure 13:
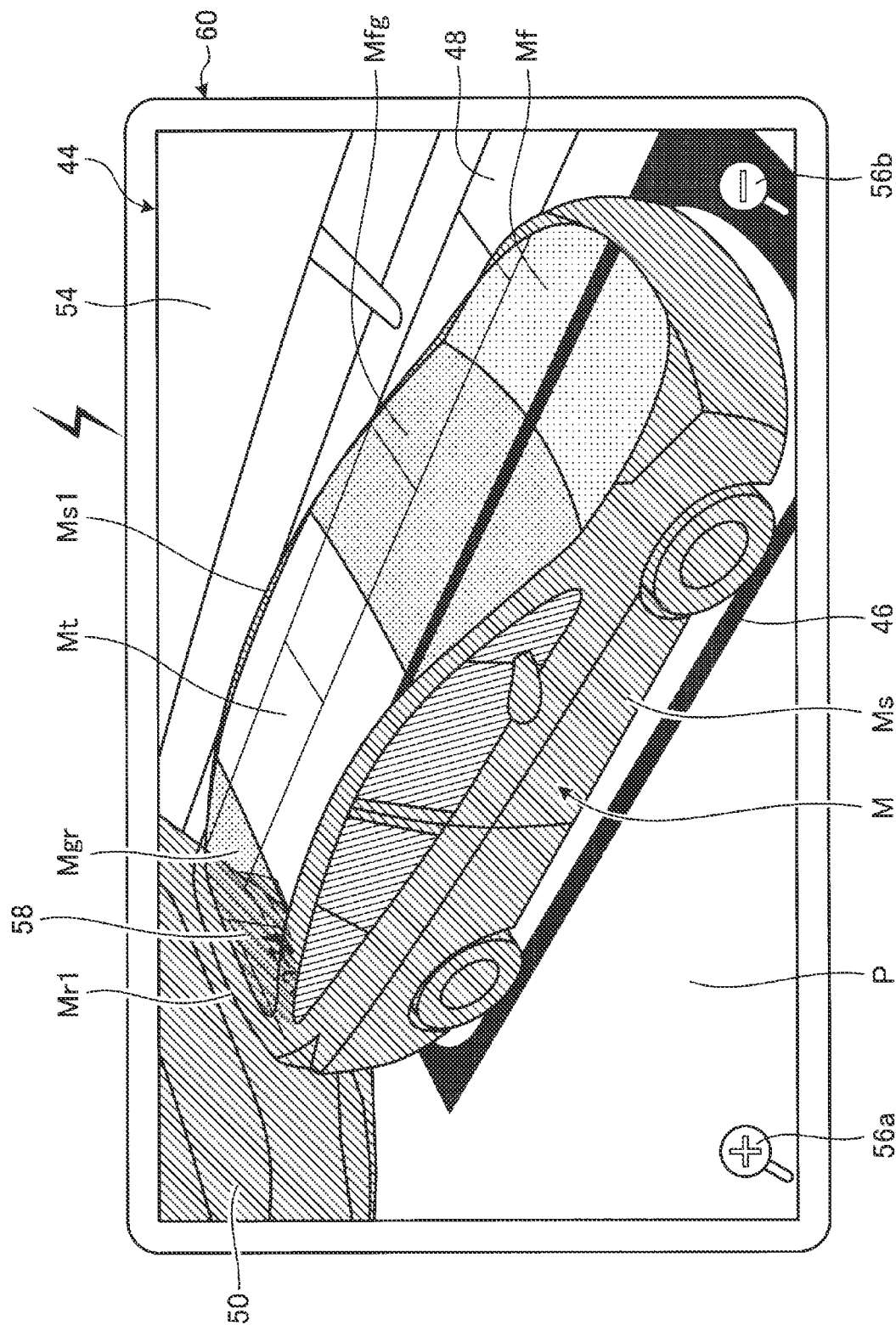
FIG. 13 is an exemplary and schematic explanatory view illustrating a case where the vehicle surrounding image with the own vehicle image overlapped thereon, which may be displayed by the periphery monitoring device according to the embodiment, is displayed on a display device outside the vehicle.

In addition, in the above-described embodiment, a configuration in which an image in which the own vehicle image M, the transmissive state of a constituent plane of which has been determined, is overlapped on the vehicle surrounding image P is displayed on the display device 16 mounted in the vehicle 10 to allow the user inside the vehicle 10 to check displayed content has been explained. In another embodiment, an image having substantially the same content as the image displayed on the in-vehicle display device 16 may be displayed on an external display device existing outside the vehicle 10. FIG. 13 is an exemplary and schematic explanatory view illustrating a case of displaying an image on an external display device 60. The external display device 60 is, for example, a mobile terminal such as a smart phone or a tablet terminal having a display device. In this case, for example, the output unit 38f (see FIG. 3) of the processing unit 38 includes a transmission/reception module which performs transmission and reception of control signals for instructing transmission and reception of display requests to and from the external display device 60, selection or movement of the position of the virtual viewpoint K, and enlargement and contraction operations of image content, and transmission and reception of images generated by the processing unit 38. For example, when authentication is established between the transmission/reception module and the external display device 60, the transmission/reception module transmits an image to the external display device 60.

For example, it is assumed that the vehicle 10 includes an automatic parking system in which the user outside the vehicle 10 remotely and automatically parks the vehicle 10 by operating a mobile terminal such as a smart phone or a tablet possessed by the user. In such a vehicle 10, when the user outside the vehicle 10 executes remote automatic parking, by allowing the user to check an image displayed on the external display device 60 possessed by the user, it is possible to allow the user to grasp the situation on a blind spot for the user, such as, the opposite side of the vehicle 10. As a result, the user may perform an operation such as remote automatic parking while checking the screen of the external display device 60 without checking safety while moving around the vehicle 10. Thus, the automatic parking system may be used more safely and more easily. In addition, the external display device 60 may also perform, setting or position change of the virtual viewpoint K or enlargement or contraction of an image using various icons (e.g., icons 56a and 56b) displayed on the screen or operation switch similarly to the in-vehicle display device 16.

Further, in another embodiment, the external display device 60 may be a display device of another system provided outside the vehicle. For example, when the vehicle 10 includes an automatic traveling system, an image in which the own vehicle image M, the transmissive state of a constituent plane of which has been determined, generated by the periphery monitoring system 100 of the present embodiment, is overlapped on the vehicle surrounding image P may be displayed on a display device provided in a control center that manages traveling of the vehicle 10, or the like. In this case, it is possible to easily check the surrounding situation of the vehicle 10 or a positional relationship between the vehicle 10 and an object existing in the vicinity even in a remote place. As a result, a system that may be remotely operated such as an automatic traveling system may be used more safely and more easily.

In addition, in the above-described embodiment, an example in which the transmittance is calculated based on the magnitude of a Y-axis direction value (Y-component) of the normal vector n perpendicular to the individual plane of the polygon PL, and the plane closer to the direction of the road surface has a higher transmittance has been explained. In another embodiment, for example, the transmittance may be calculated based on the magnitude of a Z-axis direction value (Z-component) of the normal vector n perpendicular to the individual plane of the polygon PL. In this case, the transmissive state in the Z-axis direction may be changed. For example, when the virtual viewpoint K is set to a position equal to or lower than the vehicle height in front of or behind the own vehicle image M, for example, the other vehicle 50 behind the own vehicle image M may be displayed over the own vehicle image M through a longitudinal constituent plane (a front grill, a rear door or the like) when the own vehicle image M is viewed from the front. Similarly, the transmittance may be calculated based on the magnitude of an X-axis direction value (X-component) of the normal vector n perpendicular to the individual plane of the polygon PL. In this case, the transmissive state in the X-axis direction may be changed. For example, when the virtual viewpoint K is set to a position equal to or lower than the vehicle height on the lateral side of the own vehicle image M, the guardrail 54 or the like may be displayed over the own vehicle image M through a constituent plane in the vehicle width direction (transverse side surface) when the own vehicle image M is viewed from the lateral side. Further, when the virtual viewpoint K is determined in advance, the own vehicle image M may be prepared in advance as a two-dimensional image and may be overlapped. Thus, a low-performance CPU may improve the visibility of a portion hidden by the own vehicle image M, and may realize display to make it easy to intuitively grasp a relationship between the own vehicle image M (the vehicle 10) and the surroundings as in the present embodiment.

Further, in the above-described embodiment, an example in which captured images (data) imaged by the imaging units 14 are projected onto the virtual projection plane Sp which is a three-dimensional shape model illustrated in FIG. 5 to generate the three-dimensional vehicle surrounding image P and the own vehicle image M is overlapped thereon has been explained. In another embodiment, the captured images (data) imaged by the imaging units 14 may be projected onto a planar model. That is, the three-dimensional own vehicle image M may be overlapped on a planar image obtained by connecting the captured images as illustrated in FIG. 4. In this case, an object included in the vehicle surrounding image extends toward the edge portion, but calculation load for generating the vehicle surrounding image is reduced, and the low-performance CPU 24a may realize display using the own vehicle image M, the transmissive state of which is determined according to the direction of a constituent plane, and may display the blocked area hidden by the own vehicle image M as in the present embodiment.

In addition, in the above-described embodiment, an example in which the transmissive state of a constituent plane constituting the own vehicle image M is determined according to the direction of the constituent plane has been illustrated. In another embodiment, the transmissive state of the constituent plane may be determined according to the position of the virtual viewpoint K and the direction of the constituent plane. For example, when the position of the virtual viewpoint K is lowered to the same height as the side surface, the front surface, or the rear surface of the vehicle 10, i.e., when the vehicle 10 is viewed from the lateral side, the front side, or the rear side in a state close to a horizontal view, the surface having a higher transmittance may be the side surface, the front surface, or the rear surface which is close to the direction perpendicular to the road surface other than a surface close to the direction of the road surface (e.g., a ceiling portion). In such a case, more practical display may be realized by determining the transmittance in consideration of the position of the virtual viewpoint K.

A periphery monitoring processing program executed by the CPU 24a of the embodiment may be a file in an installable or executable format, and may be configured so as to be recorded and provided on a computer readable recording medium such as a CD-ROM, a flexible disk (FD), a CD-R, or a digital versatile disk (DVD).

Moreover, the periphery monitoring processing program may be stored in a computer connected to a network such as the Internet and may be configured so as to be provided by being downloaded via the network. Further, the periphery monitoring processing program executed in the embodiment may be configured so as to be provided or distributed via a network such as the Internet.

A periphery monitoring device according to an aspect of this disclosure includes, for example, an acquisition unit configured to acquire a captured image from an imaging unit that captures an image of a periphery of a vehicle, a generation unit configured to generate a vehicle surrounding image indicating a situation around the vehicle in a virtual space based on the captured image, and a processing unit configured to display, on a display device, an image in which an own vehicle image is overlapped on the vehicle surrounding image, the own vehicle image indicating the vehicle in which a transmissive state of a constituent plane representing a plane constituting the vehicle is determined according to a direction of the constituent plane, and the vehicle surrounding image being represented based on a virtual viewpoint facing the vehicle in the virtual space. According to this configuration, the own vehicle image is partially displayed in a high transmissive state, for example, according to the direction of the constituent plane. As a result, the area hidden by the own vehicle image may be easily seen, and the shape of the own vehicle image may be easily grasped based on a portion of the own vehicle image in a low transmissive state. This may make it easy to grasp a relationship between the vehicle (own vehicle image) and the surroundings.

For example, the processing unit of the periphery monitoring device according to the embodiment may overlap the own vehicle image forming the constituent plane with a plurality of polygons on the vehicle surrounding image. According to this configuration, for example, since the transmissive state may be finely determined for each polygon, both an improvement in the visibility of the area blocked by the own vehicle image and an improvement in the ease of grasping a relationship between the vehicle (own vehicle image) and the surroundings may be realized in balance.

For example, the processing unit of the periphery monitoring device according to the embodiment may determine a transmissive state of an individual plane defined for each polygon according to a direction of the individual plane with respect to a horizontal plane in the vehicle surrounding image. According to this configuration, for example, since the transmissive state may be determined for each polygon, a smooth change in the transmissive state is possible, and easily visible display of the own vehicle image with little discomfort is possible.

For example, for each of the polygons configuring a three-dimensional shape of a surface of the vehicle indicated as the own vehicle image, the processing unit of the periphery monitoring device according to the embodiment may display the polygon with a lower transmittance as a vector component in a normal direction of the horizontal plane in a normal vector of the polygon is reduced. According to this configuration, for example, since the transmissive state may be determined for each polygon according to the magnitude of the vector component in the normal direction of the horizontal plane, the processing becomes easy. Further, even if the position of the virtual viewpoint is changed, the transmissive state of the constituent plane is kept constant. As a result, the transmissive state of the same constituent plane in the own vehicle image may be prevented from changing according to the position of the virtual viewpoint, and easily visible display of the own vehicle image and the area hidden by the own vehicle image with little discomfort may be realized.

For example, when overlapping the own vehicle image on the vehicle surrounding image, the processing unit of the periphery monitoring device according to the embodiment may overlap a shadow image corresponding to the own vehicle image when the own vehicle image is viewed from directly above on the vehicle surrounding image immediately below the own vehicle image. According to this configuration, for example, the area where the vehicle exists (particularly an edge portion of the vehicle) in the vehicle surrounding image may be clearly indicated, and when there is an obstacle around the vehicle (own vehicle image), a relationship (e.g., a distance relationship) between the obstacle and the vehicle (own vehicle image) may be more clearly displayed.

For example, when overlapping the own vehicle image on the vehicle surrounding image, the processing unit of the periphery monitoring device according to the embodiment may not draw the constituent plane that is a back surface side of the own vehicle image with respect to the virtual viewpoint. According to this configuration, for example, since no polygon on the back surface side is displayed, the area hidden by the own vehicle image may be clearly displayed only by changing the transmissive state of the constituent plane on the surface side (virtual viewpoint side).

For example, the processing unit of the periphery monitoring device according to the embodiment may display the constituent plane in a non-transmissive state when a normal of the constituent plane is substantially orthogonal to a normal of the horizontal plane in the vehicle surrounding image. According to this configuration, the constituent plane when the normal of the constituent plane is substantially orthogonal to the normal of the horizontal plane in the vehicle surrounding image, for example, a side surface portion of the own vehicle image may be overlapped on an area corresponding to the bottom of the vehicle in the vehicle surrounding image in many cases. In this case, an obstacle existing around the vehicle imaged by the imaging unit is less likely to be hidden by the side surface portion. Thus, when the normal of the constituent plane is substantially orthogonal to the normal of the horizontal plane in the vehicle surrounding image, by displaying the constituent plane in a non-transmissive state, both an improvement in the ease of recognizing the own vehicle image (vehicle) and an improvement in the ease of recognizing the obstacle existing around the vehicle may be achieved.

For example, the processing unit of the periphery monitoring device according to the embodiment may transmit the image in which the own vehicle image having the constituent plane in the determined transmissive state is overlapped on the vehicle surrounding image to a display device outside the vehicle to display the image on the display device. According to this configuration, for example, a user outside the vehicle may display the vehicle surrounding image together with the own vehicle image on a display device (e.g., a mobile terminal such as a smart phone and the like) which may be operated by the user. As a result, it is possible to make it easy for the user outside the vehicle to recognize the area hidden by the own vehicle image and the area actually hidden by the vehicle. Further, even in this case, the shape of the own vehicle image may be easily grasped based on the portion of the own vehicle image in a low transmissive state, and a relationship between the vehicle (own vehicle image) and the surroundings may be easily grasped outside the vehicle.

Although the embodiments and modifications of this disclosure have been described, these embodiments and modifications are merely given by way of example, and are not intended to limit the scope of the disclosure. These novel embodiments may be implemented in various other forms, and various omissions, substitutions, and changes may be made without departing from the gist of the disclosure. These embodiments and modifications thereof are included in the scope or gist of the disclosure and are included in the disclosure described in the claims and the equivalent range thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A periphery monitoring device comprising:
a hardware processor configured to implement:
an acquisition unit configured to acquire a captured image from an imaging unit that captures an image of a periphery of a vehicle;
a generation unit configured to generate a vehicle surrounding image indicating a situation around the vehicle in a virtual space based on the captured image; and
a processing unit configured to display, on a display device, an image in which an own vehicle image is overlapped on the vehicle surrounding image, the own vehicle image indicating the vehicle in which a transmissive state of a constituent plane representing a plane constituting the vehicle is determined according to a direction of the constituent plane, and the vehicle surrounding image being represented based on a virtual viewpoint facing the vehicle in the virtual space,
the processing unit overlaps the own vehicle image forming the constituent plane with a plurality of polygons on the vehicle surrounding image,
the processing unit determines a transmissive state of an individual plane according to the orientation of the individual plane defined for each polygon constituting the vehicle image with respect to a horizontal plane in the vehicle surrounding image.

2. The periphery monitoring device according to claim 1, wherein
for each of the polygons configuring a three-dimensional shape of a surface of the vehicle indicated as the own vehicle image, the processing unit displays the polygon with a lower transmittance as a vector component in a direction normal to the horizontal plane in a normal vector of the polygon is reduced.

3. The periphery monitoring device according to claim 1, wherein
when overlapping the own vehicle image on the vehicle surrounding image, the processing unit provides a shadow image corresponding to the own vehicle image on the vehicle surrounding image immediately below the own vehicle image so as to overlap when the own vehicle image is viewed from directly above.

4. The periphery monitoring device according to claim 1, wherein
when overlapping the own vehicle image on the vehicle surrounding image, the processing unit does not draw the constituent plane that is a back surface side of the own vehicle image with respect to the virtual viewpoint.

5. The periphery monitoring device according to claim 1, wherein
the processing unit displays the constituent plane in a non-transmissive state when a normal of the constituent plane is substantially orthogonal to a normal of the horizontal plane in the vehicle surrounding image.

6. The periphery monitoring device according to claim 1, wherein
the processing unit transmits the image in which the own vehicle image having the constituent plane in the determined transmissive state is overlapped on the vehicle surrounding image to a display device outside the vehicle to display the image on the display device.

* * * * *